United States Patent
Perez-Cavero

[11] 3,898,530
[45] Aug. 5, 1975

[54] PROTECTIVE DEVICES FOR ELECTRIC POWER TRANSMISSION SYSTEMS

[75] Inventor: Leonardo Perez-Cavero, Stafford, England

[73] Assignee: The General Electric Company Limited, London, England

[22] Filed: Nov. 27, 1973

[21] Appl. No.: 419,289

[30] Foreign Application Priority Data
Nov. 28, 1972 United Kingdom.............. 54834/72

[52] U.S. Cl............................... 317/27 R; 317/36 D
[51] Int. Cl. ............................................. H02h 3/26
[58] Field of Search....... 317/36 D, 27 R; 324/83 R, 324/83 Q

[56] References Cited
UNITED STATES PATENTS

| | | |
|---|---|---|
| 3,024,389 | 3/1962 | Warrington...................... 317/36 D |
| 3,192,442 | 6/1965 | Warrington et al............... 317/36 D |
| 3,519,884 | 7/1970 | Paddison et al. ................. 317/36 D |
| 3,651,377 | 3/1972 | Souillard........................... 317/36 D |
| 3,732,464 | 5/1973 | Miki et al. ........................ 317/36 D |

Primary Examiner—James D. Trammell
Attorney, Agent, or Firm—Kirschstein, Kirschstein, Ottinger & Frank

[57] ABSTRACT

A device for use in detecting earth faults in a polyphase electric power transmission system by monitoring the difference (e.g., in phase) between a selected parameter and polarising parameter which has a predetermined relation with a voltage which, for a fault to earth at a point at a distance not greater than said predetermined distance along the line from said device, has a value equal to the zero-sequence voltage at that point.

6 Claims, 4 Drawing Figures

PROTECTIVE DEVICES FOR ELECTRIC POWER TRANSMISSION SYSTEMS

This invention relates to devices for use in detecting the occurrence of earth faults in a polyphase electric power transmission system.

In operation some such devices monitor the difference, e.g., in phase or amplitude, between one or more selected parameters and a so-called polarising parameter.

The present invention resides in the use of a new polarising parameter which reduces the occurrence of malfunctions.

According to the invention in a device for use in detecting the occurrence of earth faults within a predetermined distance of the device along a polyphase electric power transmission system comprising means for monitoring the difference between at least one selected parameter and a polarising parameter, the polarising parameter has a predetermined relation with a voltage which, for a fault to earth at a point at a distance not greater than said predetermined distance along the line from said device, has a value equal to the zero-sequence voltage at that point.

The point on the line at said predetermined distance along the line is hereinafter called the 'reach point' and the point on the line at which the device is positioned is hereinafter called the 'monitoring point.'

The fault point zero-sequence voltage which occurs for a fault at a point is given by the expression:

$$\tfrac{1}{3} (V_{RES} - I_{RES} Z_{ro})$$

where:

$V_{RES}$ is the residual voltage at the monitoring point,
$I_{RES}$ is the residual current at the monitoring point,
$Z_{ro}$ is the zero-sequence impedance of the system between said device and said fault point.

It will be appreciated that the desired polarising parameter is readily obtainable from quantities available at the monitoring point.

In some applications of the invention the polarising parameter necessarily has a predetermined relation with a voltage which has a value equal to the fault point zerosequence voltage for a fault at the reach point, i.e., $Z_{ro}$ in the equation above must be equal to the zero-sequence impedance of the system between the device and the reach point $(Z_{L0})$. In other applications the polarising parameter may have a predetermined relation with a voltage which has a value equal to the fault point zero-sequence voltage for a fault at any particular point at a distance from the device not greater than the reach point (i.e., $Z_{ro}$ $Z_{L0}$).

The invention finds application in devices of the kind wherein the monitoring means comprises a respective phase comparator means for each phase of the system, each comparator means monitoring the phase difference between the polarising parameter and a selected parameter of the corresponding phase of the system.

The invention also finds application in devices of the kind wherein the monitoring means comprises a multi-input phase comparator means which monitors the overall phase difference between the polarising parameter and a selected parameter of each phase of the system.

The invention also finds application in devices of the kind wherein the monitoring means comprises a respective amplitude comparator means for each phase of the system, each amplitude comparator means monitoring the difference between a first derived quantity and a second derived quantity the first derived quantity being the difference between the polarising parameter and a selected parameter of the corresponding phase of the system, and the second derived quantity being the sum of the polarising parameter and a selected parameter of the corresponding phase of the system.

Several arrangements in accordance with the invention will now be described by way of example with reference to the accompanying drawings in which.

Figure 1:
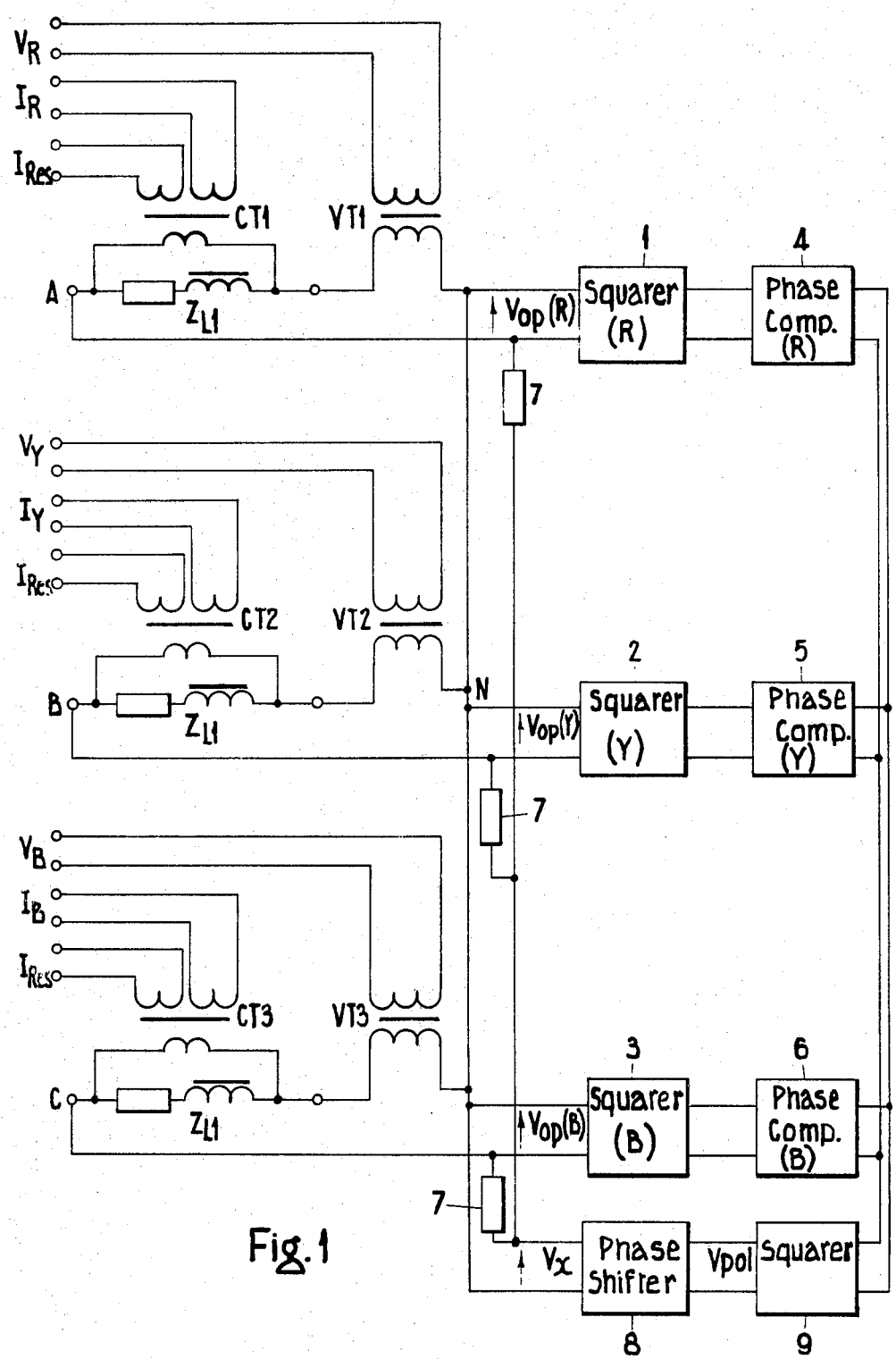
FIG. 1 is a schematic diagram of a device for detecting the occurrence of earth faults on each phase of a three-phase electric power transmission system, the device exhibiting a reactance type characteristic.

Referring to FIG. 1, the first device to be described includes three voltage transformers VT1, VT2 and VT3 to whose primaries are respectively applied the red yellow and blue phase to earth voltages $V_R$, $V_Y$ and $V_B$ of the system at the monitoring point.

The device further includes three current transformers CT1, CT2 and CT3 each of which has a first primary winding through which passes a respective one of the three phase currents $I_R$, $I_Y$ and $I_B$ at the monitoring point, and a second primary winding through which passes the residual current $I_{RES}$ at the monitoring point. Each of the transformers CT1, CT2 and CT3 has connected across its secondary a replica impedance $Z_{L1}$ having a value equal to that of the positive sequence impedance per phase of the system between the monitoring point and the reach point of the device (i.e., the far end from the monitoring point of the section of the system over which the device is designed to detect earth faults), referred to the secondary level.

Each of the impedances $Z_{L1}$ is connected in series with the secondary of the corresponding voltage transformer VT1, VT2 or VT3 between a common point N and a respective one of three points A, B and C. The turns ratios of the windings of the transformers are chosen so that compound voltages Vop(R), Vop(Y) and Vop(B) appear respectively between the points A, B, C and point N, which voltages are given by the following equations:

$$Vop(R) = V_R - Z_{L1} (I_R + K I_{RES}) \quad (1)$$

$$Vop(Y) = V_Y - Z_{L1} (I_Y + K I_{RES}) \quad (2)$$

$$Vop(B) = V_B - Z_{L1} (I_B + K I_{RES}) \quad (3)$$

where $$K = \frac{Z_{L0} - Z_{L1}}{3 Z_{L1}} \quad (4)$$

and $Z_{L0}$ is the zero-sequence impedance of the system between the monitoring point and the reach point of the device, referred to the secondary level.

The voltages $Vop(R)$, $Vop(Y)$ and $Vop(B)$ are respectively applied via three squarers 1, 2 and 3 to first inputs of three phase comparators 4, 5 and 6.

The voltages $Vop(R)$, $Vop(Y)$ and $Vop(B)$ are combined via equal resistors 7 to produce a voltage $Vx$ which is applied via a phase shifter 8 and a squarer 9 to a second input of each of the comparators 4, 5 and 6. From equations (1), (2) and (3) above it can be seen that $Vx = Vop(R) + Vop(Y) + Vop(B) = V_{RES} - (I_{RES} + 3K I_{RES}) Z_{L1}$ (5)

substituting for $K$ from equation (4) gives $$Vx = V_{RES} - Z_{L0} I_{RES} \quad (6)$$

When the fault occurs at the reach point, the voltage $Vx$ is equal to $3 Vo$, where $Vo$ is the zero-sequence voltage at the fault point.

The phase shifter 8 is arranged to provide a phase shift of $\phi r$. The value of $\phi r$ will usually be:

$$\Phi r = \frac{\Phi_o^{max} + \Phi_o^{min}}{2} \quad (7)$$

where $\phi_o$ is the argument of the zero-sequence impedance of the system, which argument varies with the power system conditions between a maximum value $\phi_o$ max and a minimum value $\phi_o$ min. Other values of $\phi r$ may be used in alternative arrangements.

The output of the phase shifter constitutes a polarising voltage $V_{POL}$ for the device, an earth fault on a phase in the section of the system protected by the device being indicated when the corresponding phase comparator detects a phase difference between its first and second inputs of greater than ± 90°.

It will be appreciated that due to the variation of $\phi_o$ with power system conditions, the length of the section of the system over which the device will respond to earth faults with a certain arc resistance increases or decreases as $100_o$ becomes greater or less than $\phi_r$, i.e., the device overreaches or underreaches. However, the extent to which this occurs is appreciably less than in known devices wherein other polarising parameters such as phase current or zero-sequence current at the monitoring point are used.

Another advantage of the device shown in FIG. 1 is that it operates correctly even if the system is not earthed behind the relay point, that is with no zero-sequence current at the relay point.

Figure 2:
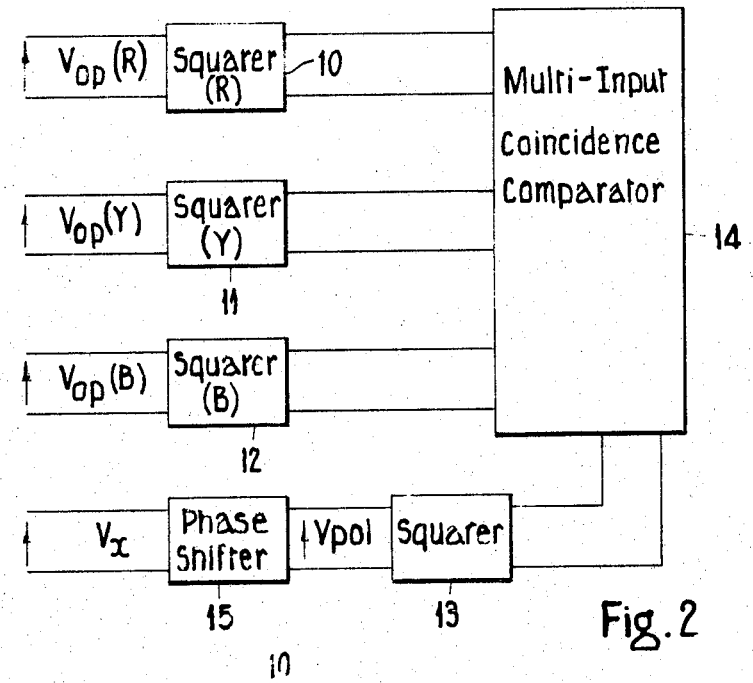
FIG. 2 is a schematic diagram of a device for detecting the occurrence of earth faults in a three-phase electric power transmission system, the device exhibiting a mho-reactance type characteristic.

Referring now to FIG. 2, in the second device to be described, voltages $Vop(R)$, $Vop(Y)$, $Vop(B)$ and $VpoL$ are applied via respective squarers 10 to 13 to respective inputs of a multi-input coincidence comparator 14. The voltages $Vop(R)$, $Vop(Y)$ and $Vop(B)$ are conveniently derived in the same manner as in FIG. 1 and the polarising voltage $VpoL$ is conveniently derived from the combination of voltages $Vop$ via a phase shifter 15, as in FIG. 1.

In operation of the device an earth fault on any phase in the section of the system protected by the device is indicated when the comparator produces an output indicating that the four inputs to the comparator have an overall phase difference of less then 180°. The use of the voltage $VopL$ as polarising parameter instead of a voltage in phase with the zero-sequence current at the relay point has the same advantages as mentioned above with regard to FIG. 1.

Figure 3:
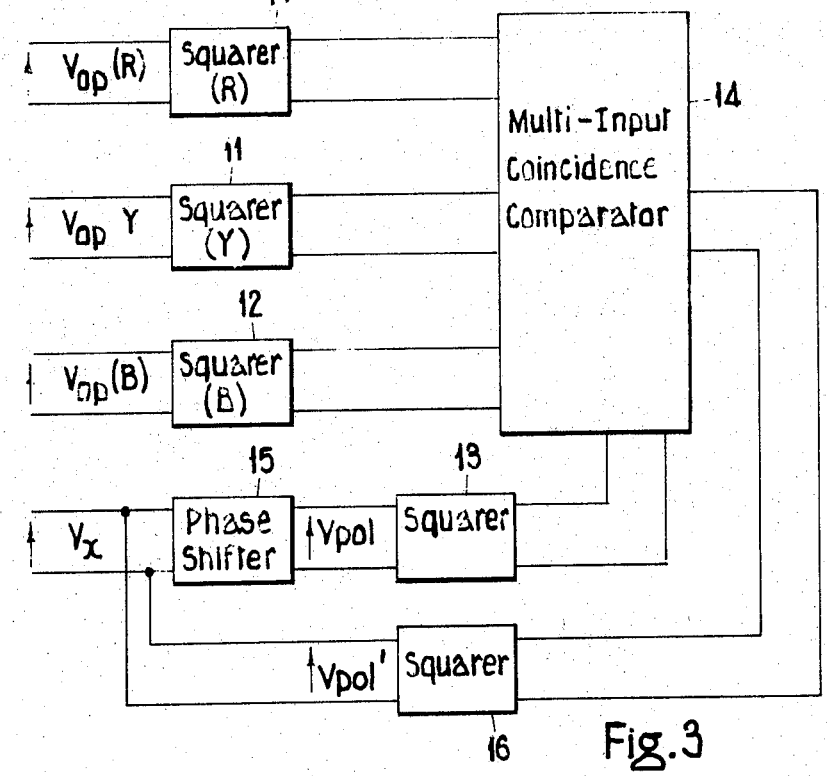
FIG. 3 is a schematic diagram of a modified form of the device shown in FIG. 2.

One difficulty experienced with the device shown in FIG. 2 is that it may respond to certain earth faults occurring behind the monitoring point. Such maloperation can be prevented by applying to a fifth input of the comparator 14 a second polarising voltage $VpoL^1$ of the kind proposed by the invention as shown in FIG. 3. This voltage $VpoL^1$ is suitably the voltage at the input of phase shifter 15 and is applied to the comparator via a further squarer 16. An earth fault is then indicated when the overall phase difference of all five inputs of the comparator 14 is less than 180°.

Alternatively the voltage $VpoL^1$ may be any other voltage given by the expression $$V_{RES} - I_{RES} I_{ro} \quad (8)$$

where $Z_{ro}$ is the zero-sequence impedance of the system between the relay point and a point at a distance from the relay point not greater than the reach point of the device.

It will be appreciated that maloperation in respect of earth faults behind the monitoring point could also be prevented in this manner in a device using a voltage in phase with the zero-sequence current at the monitoring point as the primary polarising parameter, instead of $VpoL$.

Figure 4:
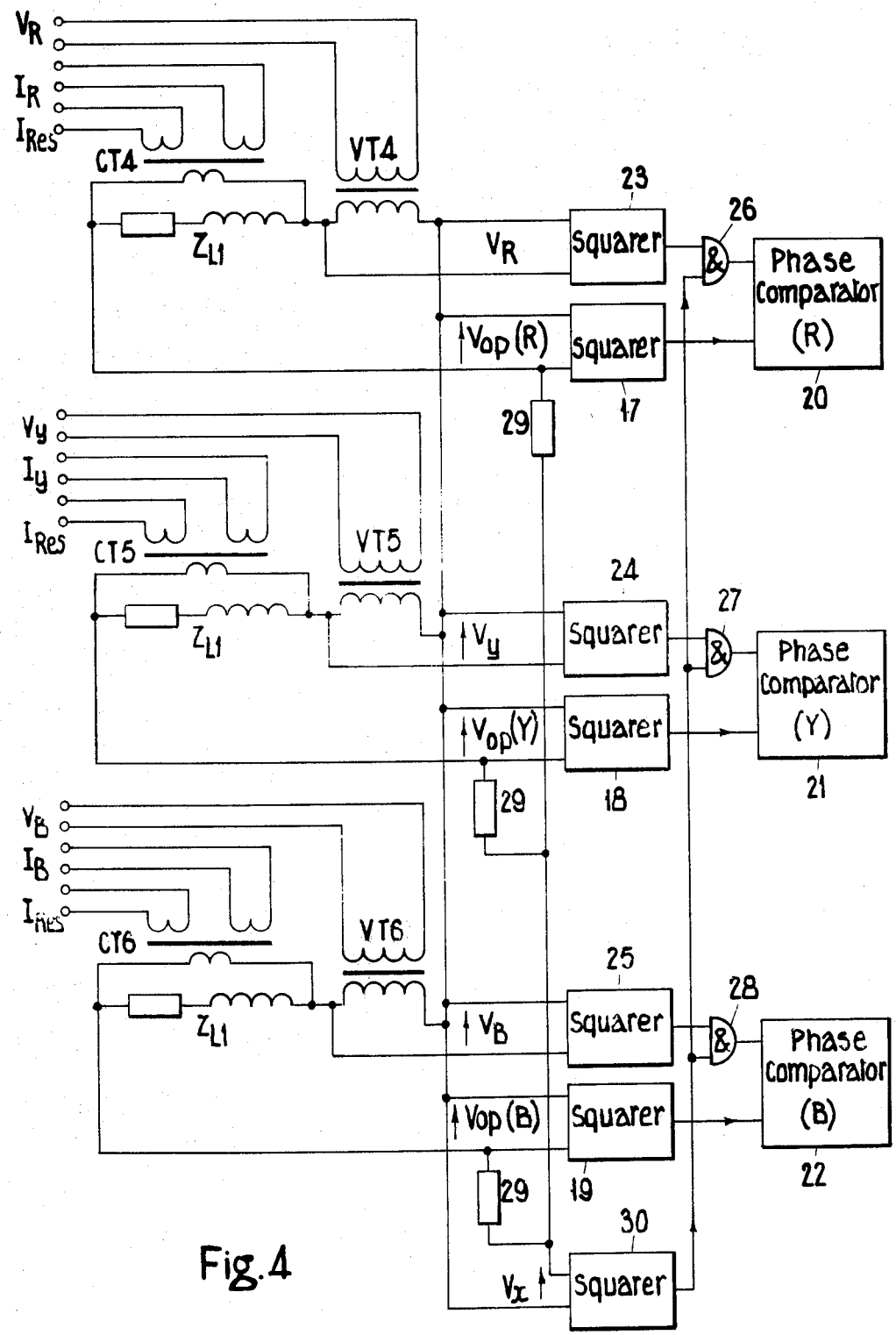
FIG. 4 is a schematic diagram of a self-polarised device for detecting the occurrence of earth faults on each phase of a three-phase electric power transmission system, the device exhibiting a mho type characteristic.

Referring now to FIG. 4, the fourth device to be described comprises three voltage transformers VT4, VT5 and VT6, three current transformers CT4, CT5 and CT6 and three replica impedances $Z_{L1}$ connected in the manner described above with reference to FIG. 1 to produce, from the phase to earth voltages $V_R$, $V_Y$ and $V_B$, the phase currents $I_R$, $I_Y$ and $I_B$ and the residual current $I_{RES}$, the three voltages $Vop(R)$, $Vop(Y)$ and $Vop(B)$ defined above in equations (1), (2) and (3).

The three voltages $Vop$ are respectively applied via three squarers 17, 18 and 19 to first inputs of three phase comparators 20, 21 and 22.

The voltages $V_R$, $V_B$ and $V_Y$ at the secondaries of the voltage transformers VT4, VT5 and VT6 are respectively applied via squarers 23, 24 and 25 to inputs of three two-input AND gates 26, 27 and 28.

The voltages $Vop(R)$, $Vop(Y)$ and $Vop(B)$ are combined via equal resistors 29 to produce the voltage $Vx$ defined above in equation (6), and this voltage is applied via a squarer 30 to the second input of each of the gates 26, 27 and 28, the outputs of the gates being respectively applied to second inputs of the phase comparators 20, 21 and 22.

The phase voltages ($V_R$, $V_Y$ and $V_B$) with the polarity reversed and the voltage $Vx$ serve as polarising voltages for the device, an earth fault on a phase in the section of the system protected by the device being indicated when the corresponding phase comparator detects a phase difference of more than ± 90° between its first and second inputs.

The use of the second polarising voltage $Vx$ prevents maloperation of the device for earth faults behind the relay point. The operation of the device is based on the fact that the two polarising voltages and the operating voltage can never be in the same half plane (in a voltage diagram) for earth faults behind the relay point.

It will be appreciated that the second polarising voltage may be any voltage given by the expression (8) above. However, the best results will normally be obtained when $Z_{ro}$ and hence the polarising voltage is as large as possible, that is when $Z_{ro} = Z_{L0}$ as in the arrangement of FIG. 4.

In a modification of the arrangement shown in FIG. 4 the AND gates 26, 27 and 28 are in the circuits of the operating voltages $Vop(R)$, $Vop(Y)$ and $Vop(B)$ instead of the phase voltages $V_R$, $V_Y$ and $V_B$.

It will be appreciated that the principle of operation embodied in the arrangement of FIG. 4 can be used with types of protective device other than that shown in FIG. 4, and can, for example, be used with sound-phase polarised mho relays and relays having quadrilateral characteristics.

Whilst in the particular devices described above by way of example the occurrence of faults is detected by monitoring phase difference, in other devices in accordance with the invention the occurrence of faults is detected by monitoring amplitude difference. One such other device comprises a respective amplitude comparator means for each phase of the system, each amplitude comparator means monitoring the difference between a first derived quantity and a second derived quantity the first derived quantity being the difference between the polarising parameter and a selected parameter of the corresponding phase of the system, and the second derived quantity being the sum of the polarising parameter and a selected parameter of the corresponding phase of the system.

I claim:

1. A device for use in detecting earth faults within a predetermined distance of the device along a polyphase electric power transmission system comprising: means for generating a polarising voltage which has a predetermined relation with a voltage which, for a fault to earth at a point at a distance not greater than said predetermined distance along the line from said device, has a value equal to the zero-sequence voltage at that point; means for generating a plurality of further voltages, one for each phase of the system, each of which further voltages has a predetermined relation with the polarising voltage when an earth fault occurs; and monitoring means for detecting the occurrence of said predetermined relations between the polarising voltage and said further voltages.

2. A device according to claim 1 wherein said monitoring means comprises a plurality of phase comparators, one for each phase of the system, each comparator having a first input to which said polarising voltage is applied and a second input to which the further voltage of the corresponding phase of the system is applied, each comparator being arranged to detect the occurrence of a predetermined phase relation between its inputs.

3. A device according to claim 1 wherein said monitoring means comprises a multi-input phase comparator having a first input to which said polarising voltage is applied and a plurality of further inputs to each of which the further voltage of a different phase of the system is applied, the comparator being arranged to detect the occurrence of a predetermined overall phase relation between its inputs.

4. A device according to claim 1 wherein said means for generating said further voltages produces a respective compound voltage in respect of each phase of the system of the form $$Vp - Z_{L1}(Ip + \frac{(Z_{L0} - Z_{L1})}{N Z_{L1}} I_{RES})$$

where $Vp$ represents the phase voltage at the monitoring point $Ip$ represents the phase current at the monitoring point $I_{RES}$ represents the residual current at the monitoring point $Z_{L1}$ represents the positive sequence impedance per phase between the monitoring point and the reach point $Z_{L0}$ represents the zero-sequence impedance between the monitoring point and the reach point $N$ is the number of phases in the system.

5. A device according to claim 4 wherein said means for generating a polarising voltage comprises means for combining said compound voltages.

6. A device according to claim 5 wherein said means for generating a polarising voltage includes a phase-shifter which changes the phase of the voltage obtained by combining the compound voltages by an amount dependent on the argument of the zero-sequence impedance of the system.

* * * * *